United States Patent Office 2,895,988
Patented July 21, 1959

2,895,988

ACYLATED TRIIODOAMINOPHENYLALKANOIC ACIDS AND PREPARATION THEREOF

Sydney Archer and James O. Hoppe, Bethlehem, N.Y., assignors to Sterling Drug Inc., New York, N.Y., a corporation of Delaware No Drawing. Application September 5, 1957
Serial No. 682,075

20 Claims. (Cl. 260—518)

This invention relates to acylated triiodoaminophenylalkanoic acids. A particular aspect of the invention relates to new triiodoacylaminophenylalkanoic acids having the formula

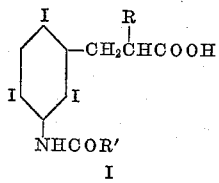

wherein R and R' are members of the group consisting of hydrogen and alkyl radicals having from one to about four carbon atoms.

Our new compounds are useful as X-ray contrast agents, and are particularly valuable in the visualization of the gallbladder (cholecystography). Moreover, the exceptionally low toxicity of these compounds as compared to the toxicity of known cholecystographic agents contributes to their versatility in the method of administration and the body structures outlined.

The intravenous toxicity of our compounds is only about one-third to one-half as great as that of known cholecystographic agents, and consequently our compounds can be administered by that route without danger of side effects. The known cholecystographic agents presently in use, namely, tetraiodophenolphthalein, α-phenyl - β - (3,5 - diiodo - 4 - hydroxyphenyl)propionic acid, and α - ethyl - β - (2,4,6 - triiodo - 3 - aminophenyl)propionic acid, all produce symptoms of systemic intoxication upon intravenous injection.

In addition to their routine use in cholecystography by both intravenous and oral administration, our compounds, by virtue of their lower toxicity, can be injected intravenously in sufficient dosage to visualize the intrahepatic as well as the extrahepatic bile ducts.

Another aspect of the invention relates to (3-diacylamino-2,4,6-triiodophenyl)alkanoic acids having the formula

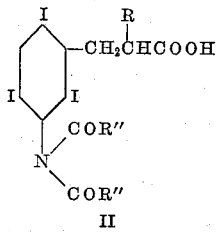

wherein R" represents a lower-alkyl radical having from one to about four carbon atoms, and R represents hydrogen or a lower-alkyl radical having from one to about four carbon atoms; and to salts thereof.

The compounds of Formula II have also been found to be useful as X-ray contrast agents, and when administered intravenously in the form of a water-soluble salt in concentrated aqueous solution, or orally either as the free acid or as a salt, the compounds concentrate in the gallbladder, thus serving as cholecystographic agents. The compounds of the invention possess a low toxicity and do not produce untoward effects in the animal organism at doses sufficient to visualize the gallbladder.

In the above structural Formulas I and II, when R, R' or R" represent lower-alkyl radicals having from one to about four carbon atoms, they stand for such groups as methyl, ethyl, propyl, isopropyl, butyl, secondary-butyl and tertiary-butyl.

The new triiodoacylaminophenylalkanoic acids of Formulas I and II are prepared by acylation of the corresponding triiodoaminophenylalkanoic acids having the formula

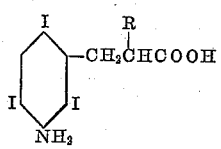

The acylation is carried out by heating the amino compound with an alkanoic acid, R'COOH, or a reactive derivative thereof such as the acid halide, R'COX, where X is chloride or bromine, or the acid anhydride

R'—CO—O—CO—R'

A preferred method comprises heating the amine with a lower-aliphatic acid anhydride in the presence of a catalytic amount of a strong acid such as sulfuric acid or perchloric acid. In the case where R' is H in Formula I a formylation process is involved which is conveniently carried out by heating the amine with formic acid and acetic anhydride.

In the preferred process of heating a compound of Formula III with a lower-alkanoic acid anhydride, the product obtained depends upon the conditions of time and temperature and the relative amounts of reactions used. If an excess of anhydride is used at temperatures above about 100° C. and the reaction allowed to proceed to completion, a diacylated product of Formula II is produced. However, if limited quantities, about one molar equivalent of anhydride is used, and/or a temperature less than about 100° C. is employed, and/or the reaction is terminated before appreciable diacylation takes place, the predominant product is a monoacylated compound of Formula I. Under intermediate conditions mixtures of monoacylated and diacylated products are obtained.

The structures of the compounds of the invention are established by the mode of synthesis in conjunction with elementary analysis of the species of the following examples.

The intermediate (2,4,6 - triiodo - 3 - aminophenyl)alkanoic acids are a known class of compounds (U.S. Patent 2,705,726) and are prepared by iodination of the appropriate (3-aminophenyl)alkanoic acids with iodine monochloride in acid solution. The (3-aminophenyl)alkanoic acids which can be used as starting materials include β-(3-aminophenyl)propionic acid, α-methyl-β-(3-aminophenyl)propionic acid, α-ethyl-β-(3-aminophenyl)propionic acid, α-propyl-β-(3-aminophenyl)propionic acid, α-isopropyl-β-(3-aminophenyl)propionic acid, α-butyl-β-(3-aminophenyl)propionic acid, α-isobutyl-β-(3-aminophenyl)propionic acid, α-secondary-butyl-β-(3-aminophenyl)propionic acid, and α-tertiary-butyl-β-(3-aminophenyl)propionic acid. Exhaustive iodination of these compounds produces, respectively, β-(2,4,6-triiodo-3-aminophenyl)propionic acid, α-methyl-β-(2,4,6-triiodo-3-aminophenyl)propionic acid, α-ethyl-β-(2,4,6-triiodo-3-aminophenyl)propionic acid, α-propyl-β-(2,4,6-triiodo-3-aminophenyl)propionic acid, α-isopropyl-β-(2,4,6-triiodo-3-aminophenyl)propionic acid, α-butyl-β-(2,4,6-triiodo- 3-aminophenyl)propionic acid, α-isobutyl-β-(2,4,6-triiodo-3-aminophenyl)propionic acid, α-secondary-butyl-β-(2,4,6-triiodo-3-aminophenyl)propionic acid, and α-tertiary-butyl-β-(2,4,6-triiodo - 3 - aminophenyl)propionic acid. These iodinated compounds can be acylated as described above to produce N-formyl, N-acetyl, N,N-diacetyl, N-propionyl, N,N-dipropionyl, N-butyryl, N-isobutyryl, N-valeryl, N-isovaleryl, and the like derivatives, which are compounds of our invention.

For oral administration the compounds of the invention can be used either as the free acid or in the form of therapeutically acceptable salts derived from neutralization of the acids with inorganic or organic bases. For intravenous administration, a concentrated aqueous solution of a pharmacologically acceptable water-soluble salt is used, for example, the sodium, diethanolamine or N-methylglucamine salts. Other salts, whether toxic or non-toxic, are useful as intermediates for and in purification of the acids of the invention.

The following examples will illustrate the invention more fully without the latter being limited thereby.

EXAMPLE 1

(a) α -*Ethyl - β - (2,4,6 - triiodo - 3 - aminophenyl)-propionic acid*

A solution of 5.0 g. of β-(3-aminophenyl)propionic acid in 100 ml. of water containing 5 ml. of concentrated hydrochloric acid was added over a period of one-half hour to a stirred solution of 3.2 ml. of iodine monochloride in 25 ml. of water and 25 ml. of concentrated hydrochloric acid heated to 60° C. After addition was complete, the heating was continued for one-half hour longer at 60–70° C. A black oil separated which gradually solidified. The mixture was then cooled and sodium bisulfite was added to decolorize. Recrystallization of the product from methanol gave about 8 g. of α-ethyl-β - (2,4,6 - triiodo-3-aminophenyl)propionic acid, M.P. 147–150° C. The product could be further purified by precipitation of its morpholine salt from ether solution and regeneration of the free amino acid by treatment of a methanol solution of the morpholine salt with sulfur dioxide. The pure amino acid had the M.P. 155–156.5° C. (corr.).

(b) α - *Ethyl - β - (2,4,6 - triiodo - 3 - acetamidophenyl)-propionic acid*

A solution of 24 g. of α-ethyl-β-(2,4,6-triiodo-3-aminophenyl)propionic acid, 50 ml. of acetic anhydride and 10 drops of concentrated sulfuric acid was heated on a steam bath for five hours. The reaction mixture was poured into ice and heated on a steam bath to hydrolyze excess acetic anhydride. The solid material was collected by filtration, dissolved in dilute sodium hydroxide solution and reprecipitated with dilute hydrochloric acid. The solid was collected by filtration and recrystallized first from acetic acid and then from an ethyl acetate-acetone mixture to give 8.2 g. of α-ethyl-β-(2,4,6-triiodo-3-acetamidophenyl)propionic acid, M.P. 223–225° C. (corr.).

Analysis.—Calcd. for $C_{13}H_{14}I_3NO_3$: I, 62.1; C, 25.47; H, 2.30. Found: I, 62.0; C, 25.77; H, 2.64.

EXAMPLE 2

α - *Ethyl - β - (2,4,6 - triiodo - 3 - acetamidophenyl)-propionic acid*

A mixture of 100 g. of α-ethyl-β-(2,4,6-triiodo-3-aminophenyl)propionic acid, 500 ml. of acetic anhydride and 2 ml. of perchloric acid was heated for four hours on a steam bath. The reaction mixture was poured into ice and again warmed on a steam bath, and the resulting solid was collected by filtration and washed well with water. The solid material was dissolved in 10% sodium hydroxide solution (105 ml.), the solution was filtered, and the filtrate was acidified by dropwise addition of dilute hydrochloric acid. Fifteen grams of sodium bisulfite was added when the neutral point was reached. The resulting precipitate was collected by filtration, dried and recrystallized from glacial acetic acid using activated charcoal for decolorizing purposes, giving 80.5 g. of α - ethyl-β-(2,4,6-triiodo - 3 - acetamidophenyl)propionic acid, M.P. 224–227° C. (corr.).

α - Ethyl - β - (2,4,6 - triiodo - 3 - acetamidophenyl)-propionic acid has an intravenous toxicity of 1030±64 mg./kg. ($LD_{50}$) and an oral $LD_{50}$ value greater than 20,000 mg./kg., both measured in mice. The corresponding unacetylated compound, α-ethyl-β-(2,4,6-triiodo-3-aminophenyl)propionic acid, has intravenous and oral toxicities of 320±20 and 15,800±1100 mg./kg., respectively. Thus the acetamido compound is much less toxic than the amino compound, the intravenous toxicity being only one-third as great. This reduced toxicity permits the use of the acetamido compound as a contrast medium by intravenous injection which is not possible with the amino compound because of symptoms of acute systemic intoxication at dosages necessary to produce gallbladder visualization.

Excellent diagnostic shadows of the gallbladder without toxic manifestations were obtained in cats and dogs upon either intravenous or oral administration of α-ethyl-β-(2,4,6-triiodo-3-acetamidophenyl)propionic acid. In the dog cholecystrograms the peripheral bile ducts were also visible.

EXAMPLE 3

*Sodium α - ethyl-β-(2,4,6-triiodo-3-acetamidophenyl-propionate*

α-Ethyl-β-(2,4,6-triiodo-3-acetamidophenyl) - propionic acid (25.30 g.) was dissolved in 200 ml. of methanol by heating, the solution was cooled to room temperature, and 2N sodium hydroxide solution was added through a burette, the neutralization being followed by a pH meter. At pH 9.2 the solution was filtered and concentrated to dryness in vacuo. The residual syrup was triturated with acetone and ether, and the resulting crystalline material was washed with ether and dried at 70° C. to give a quantitative yield of sodium α-ethyl-β-(2,4,6-triiodo-3-acetamidophenyl)propionate.

Analysis.—Calcd. for $C_{13}H_{13}I_3NO_3Na$: I, 59.9; Na, 3.65. Found: I, 59.7; Na. 3.45.

EXAMPLE 4

α-*Ethyl-β-(2,4,6-triiodo-3-formamidophenyl)propionic acid*

A mixture of 57.2 g. (0.1 mole) of α-ethyl-β-(2,4,6-triiodo-3-aminophenyl)propionic acid and 304 ml. of 99.5% formic acid was heated to 60° C. and then 262 ml. of acetic anhydride was slowly added while maintaining the temperature between 60 and 70° C. The reaction mixture was poured into 1 kg. of ice, and after the ice had melted the solid was collected by filtration and dried giving 66.5 g. of product, M.P. 205–211° C. This material was heated with 600 ml. of alcohol, cooled and collected by filtration to give a sample of α-ethyl-β-(2,4,6-triiodo-3-formamidophenyl)propionic acid, M.P. 214–216.5° C. (corr.).

Analysis.—Calcd. for $C_{12}H_{12}I_3NO_3$: I, 63.57. Found: I, 63.60.

EXAMPLE 5

α-*Ethyl-β-(2,4,6-triiodo-3-propionamidophenyl)propionic acid*

A mixture of 25 g. (0.044 mole) of α-ethyl-β-(2,4,6-triiodo-3-aminophenyl)propionic acid, 100 ml. of propionic anhydride and 10 drops of perchloric acid was heated for nine hours on a steam bath. The reaction mixture was then poured into ice and heated on a steam bath to decompose excess propionic anhydride. The aqueous layer was decanted, and the residual product was made alkaline with sodium hydroxide and filtered to remove any solid material which failed to dissolve. The filtrate was acidified with dilute hydrochloric acid and the product which precipitated was collected by filtration and washed well with warm water, dried in an oven at 50° C. and recrystallized from toluene giving 22.8 g. of product, M.P. 199–207° C. This was recrystallized from acetic acid to give 16.5 g. of α-ethyl-β-(2,4,6-triiodo-3-propionamidophenyl)propionic acid, M.P. 205.5–206.5° C. (corr).

*Analysis.*—Calcd. for $C_{14}H_{16}I_3NO_3$: I, 60.07. Found: I, 60.08.

When the preceding preparation was repeated using butyric anhydride instead of propionic anhydride there was obtained α-ethyl - β - (2,4,6 - triiodo-3 - butyramidophenyl)-propionic acid, M.P. 172–185.5° C. (corr.).

*Analysis.*—Calcd. for $C_{15}H_{18}I_3NO_3$: I, 59.36. Found: I, 58.30.

Neut. Equiv. Calcd.: 641. Found: 643.

EXAMPLE 6

(a) *β-(2,4,6-triiodo-3-aminophenyl)propionic acid*

A solution of about 16 g. of β-(3-aminophenyl)propionic acid in 50 ml. of 6N hydrochloric acid was added to a solution of 16.8 ml. of iodine monochloride in 50 ml. of 6N hydrochloric acid. The mixture was heated at 70° C. with a slow addition of water. After about thirty minutes the oily material which separated began to solidify. Water (300 ml.) was added and heating was continued for two hours. The solid was collected by filtration and converted to its sodium salt by treatment with dilute sodium hydroxide containing a little sodium chloride. The sodium salt was dissolved in water, and sulfur dioxide was passed into the solution until it was acid. The voluminous precipitate which formed was collected by filtration, partially dissolved in about 1 liter of methanol and the suspension filtered to remove insoluble material. The filtrate was decolorized with activated charcoal and cooled to produce 9.5 g. of material, M.P. 227–229° C. (uncorr.). The mother liquors were concentrated to dryness and recrystallized from acetic acid to give an additional 4.4 g. of β-(2,4,6-triiodo-3-aminophenyl)propionic acid, M.P. 225–227° C. (uncorr.). The corrected melting point was 232.5–233.5° C.

*Analysis.*—Calcd. for $C_9H_8I_3NO_2$: I, 70.13; C, 19.91; H, 1.48. Found: I, 70.50; C, 20.49; H, 1.96.

(b) *β-(2,4,6-triiodo-3-acetamidophenyl)propionic acid*

A mixture of 4.4 g. of β-(2,4,6-triiodo-3-aminophenyl)propionic acid, 50 ml. of acetic anhydride and 3 drops of concentrated sulfuric acid was refluxed for two hours. About 200 ml. of water was then added and the mixture was stirred vigorously for three hours. The resulting solid was collected by filtration and washed with water giving 5 g. of material M.P. 113–115° C. The latter was dissolved in warm sodium hydroxide solution (approximately 1 normal), the solution was filtered and saturated sodium chloride solution was added to the point of turbidity. The solution was kept for a time in the refrigerator and the resulting gelatinous solid was collected by filtration, dissolved in a minimum amount of water and acidified with acetic acid. The organic solid was collected by filtration, dried and recrystallized from glacial acetic acid using activated charcoal for decolorizing purposes, giving about 1.4 g. of β-(2,4,6-triiodo-3-acetamidophenyl)propionic acid, M.P. 263.5–264° C. (dec.). The warm sodium hydroxide effected partial hydrolysis of the β-(3-diacetamido-2,4,6-triiodophenyl)-propionic acid initially produced in the acetylation reaction.

*Analysis.*—Calcd. for $C_{11}H_{10}I_3NO_3$: I, 69.09; C, 22.58; H, 1.72. Found: I, 65.30; C, 22.79; H, 1.84.

EXAMPLE 7

*β-(2,4,6-triiodo-3-propionamidophenyl)propionic acid*

A mixture of 27.1 g. of β-(2,4,6-triiodo-3-aminophenyl) propionic acid, 100 ml. of propionic anhydride and 10 drops of concentrated sulfuric acid was heated on a steam bath for twenty hours. The solution was then poured into water and heated on a steam bath to hydrolyze excess propionic anhydride. The aqueous layer was decanted and the gummy residue dissolved in dilute sodium hydroxide solution, the solution was filtered and the filtrate acidified with dilute hydrochloric acid. The solid material was collected by filtration, washed with water, dried and recrystallized from acetone to give 16.4 g. of β - (2,4,6-triiodo-3-propionamidophenyl)propionic acid, M.P. 268–271° C.

*Analysis.*—Calcd. for $C_{12}H_{12}I_3NO_3$: I, 63.57; C, 24.06; H, 2.02. Found: I, 63.8; C, 24.35; H, 2.67.

EXAMPLE 8

(a) α - Butyl - β-(2,4,6-triiodo-3-aminophenyl)propionic acid was prepared by iodination of α-butyl-β-(3-aminophenyl)-propionic acid according to the method described in Example 6, part (a). The product melted at 175–176.5° C. (corr.) when recrystallized from dilute methanol.

(b) α - Butyl-β-(2,4,6-triiodo-3-acetamidophenyl)propionic acid can be prepared by heating α-butyl-β-(2,4,6-triiodo-3-amino-phenyl)propionic acid with an excess of acetic anhydride in the presence of a small amount of sulfuric acid.

EXAMPLE 9

(a) α - Propyl-β-(2,4,6-triiodo-3-aminophenyl)propionic acid was prepared by iodination of α-propyl-β-(3-aminophenyl)propionic acid according to the method described in Example 6, part (a). The product melted at 169–170.5° C. (corr.) when recrystallized from a chloroform-petroleum ether mixture.

(b) α - Propyl - β-(2,4,6-triiodo-3-butyramidophenyl) propionic acid can be prepared by heating α-propyl-β-(2,4,6-triiodo-3-aminophenyl)propionic acid with an excess of butyric anhydride in the presence of a small amount of sulfuric acid.

EXAMPLE 10

(a) α - Methyl-β-(2,4,6-triiodo-3-aminophenyl)propionic acid was prepared by iodination of α-methyl-β-(3-aminophenyl)-propionic acid according to the method described in Example 6, part (a). The product melted at 180–181° C. (corr.) when recrystallized from methanol.

(b) α - Methyl - β-(2,4,6-triiodo-3-valeramidophenyl)-propionic acid can be prepared by heating α-methyl-β-(2,4,6-triiodo-3-aminophenyl)propionic acid with an excess of valeric anhydride in the presence of a small amount of sulfuric acid.

EXAMPLE 11

*α - Ethyl - β-(3-diacetamido-2,4,6-triiodophenyl)propionic acid*

A mixture of 114 g. (0.2 mole) of α-ethyl-β-(3-amino-2,4,6-triiodophenyl)propionic acid, 114 ml. of acetic anhydride and 10 drops of 70% perchloric acid was refluxed for thirty minutes. The excess anhydride was decomposed by the cautious addition of hot water to the hot reaction mixture. A further quantity of water was then added to the point of turbidity, and the product was allowed to crystallize. The product was collected by filtration, washed with acetone and petroleum ether (Skellysolve A) and dried at 70° C., giving 100 g. of α-ethyl-β-(3-diacetamido-2,4,6-triiodophenyl)propionic acid, M.P. 185–191.5° C. (corr.).

*Analysis.*—Calcd. for $C_{15}H_{16}I_3NO_4$: I, 58.1. Found: I, 58.2.

α - Ethyl-β-(3-diacetamido-2,4,6-triiodophenyl)-propionic acid was found to outline the gallbladder in X-ray photographs upon oral administration in the cat at a dose level of 100 mg./kg. Its ALD$_{50}$ value (approximate lethal dose to 50% of the animals) in mice was found to be 3000 mg./kg. upon oral administration and 710 mg./kg. upon intravenous administration.

By replacement in the preceding preparation of the α-ethyl-β-(3-amino-2,4,6-triiodophenyl)propionic acid by a molar equivalent amount of α-methyl-β-(3-amino-2,4,6-triiodophenyl)propionic acid, α-propyl-β-(3-amino-2,4,6-triiodophenyl)propionic acid, or α-butyl-β-(3-amino-2,4,6-triiodophenyl)propionic acid, there can be obtained, respectively, α - methyl - β - (3 - diacetamido-2,4,6-triiodophenyl)propionic acid, α-propyl-β-(3-diacetamido-2,4,6-triiodophenyl)propionic acid, or α-butyl-β-(3-diacetamido-2,4,6-triiodophenyl)propionic acid.

EXAMPLE 12

α - Ethyl - β - (3-dipropionamido-2,4,6-triiodophenyl)-propionic acid

A mixture of 50 g. (0.088 mole) of α-ethyl-β-(3-amino-2,4,6-triiodophenyl)propionic acid, 50 ml. of propionic anhydride and 10 drops of concentrated sulfuric acid was refluxed for thirty minutes. The product was isolated according to the procedure described above in Example 11, and then recrystallized first from acetic acid and then from ethanol, and dried at 110° C., giving 26 g. of α-ethyl-β-(3 - dipropionamido-2,4,6-triiodophenyl)propionic acid, M.P. 160.5–162° C. (corr.).

Analysis.—Calcd. for C$_{17}$H$_{20}$I$_3$NO$_4$: I, 55.7. Found: I, 55.5.

α - Ethyl - β-(3-dipropionamido-2,4,6-triiodophenyl)-propionic acid was found to outline the gallbladder in X-ray photographs upon oral administration in the cat at a dose level of 100 mg./kg. The oral toxicity, ALD$_{50}$, in the mouse was 2500 mg./kg.

EXAMPLE 13

α - Ethyl-β-(3-dibutyramido-2,4,6-triiodophenyl)propionic acid

A mixture of 57.1 g. (0.1 mole) of α-ethyl-β-(3-amino-2,4,6-triiodophenyl)propionic acid, 250 ml. of butyric anhydride and 1 ml. of 70% perchloric acid was heated at 105° C. for five hours. After cooling, the reaction mixture was poured onto ice, diluted to a volume of 3 liters with water, and heated on a steam bath with addition of solid sodium carbonate to keep the mixture basic. After all the excess butyric anhydride had been hydrolyzed, the mixture was made acid with dilute hydrochloric acid, the aqueous layer decanted from the resulting gummy solid, and the latter was then washed several times with water. The product was dissolved in acetic acid, decolorized with activated charcoal, and the solution while hot diluted with water to the point of turbidity. The product was collected by filtration and dried, giving 40 g. of α - ethyl-β-(3-dibutyramido-2,4,6-triiodophenyl)propionic acid, M.P. 166–169.5° C. (corr.) when recrystallized from acetic acid.

Analysis.—Calcd. for C$_{19}$H$_{24}$I$_3$NO$_4$: I, 53.5; C, 32.08; H, 3.52. Found: I, 54.2; C, 32.27; H, 3.33.

α - Ethyl - β - (3 - dibutyramido - 2,4,6 - triiodophenyl)-propionic acid was found to outline the gallbladder in X-ray photographs upon oral administration in the cat at a dose level of 100 mg./kg. The oral toxicity, ALD$_{50}$, in the mouse was greater than 4000 mg./kg.

EXAMPLE 14

β-(3-diacetamido-2,4,6-triiodophenyl)propionic acid

A mixture of 23 g. (0.045 mole) of β-(3-amino-2,4,6-triiodophenyl)propionic acid, 26 ml. of acetic anhydride and 3 drops of perchloric acid was refluxed for thirty minutes. Water was carefully added to the reaction mixture to decompose the excess acetic anhydride, and the mixture was decolorized with activated charcoal and then diluted with water to a volume of 250 ml. to cause separation of the product. The product was collected by filtration and recrystallized from 150 ml. of 67% aqueous acetic acid. The recrystallized product was then dissolved in cold, dilute sodium hydroxide, and the solution of the sodium salt was filtered and acidified with hydrochloric acid. The precipitated product was collected by filtration and recrystallized from methyl isobutyl ketone, giving 8.5 g. of β-(3-diacetamido-2,4,6-triiodophenyl)propionic acid, M.P. 192–196° C. (corr.).

Analysis.—Calcd. for C$_{13}$H$_{12}$I$_3$NO$_3$: I, 60.7; O, 10.2. Found: I, 60.3; O, 10.2.

β-(3-diacetamido-2,4,6-triiodophenyl)propionic acid was found to outline the gallbladder in X-ray photographs upon oral administration in the cat at a dose level of 100 mg./kg., and also gave good to excellent pictures of the gallbladder upon intravenous administration in the form of the sodium salt in the cat at dose levels of 50–100 mg./kg. The intravenous toxicity, ALD$_{50}$, in the mouse was 577 mg./kg.

β-(3-diacetamido-2,4,6-triiodophenyl)propionic acid can be reacted with sodium hydroxide, diethanolamine and N-methylglucamine to produce the water-soluble sodium, diethanolamine and N-methylglucamine salts, respectively.

This application is a continuation-in-part of our prior copending application, Serial No. 331,104, filed January 13, 1953, now abandoned.

We claim:

1. A member of the group consisting of: 2,4,6-triiodo-3-acylaminophenylalkanoic acids having the formula

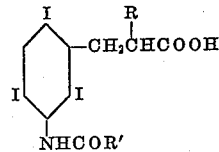

wherein R and R' are members of the group consisting of hydrogen and alkyl radicals having from one to about four carbon atoms; and pharmacologically acceptable salts thereof.

2. β-(2,4,6-triiodo - 3 - acetamidophenyl)propionic acid having the formula

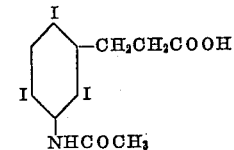

3. α - Ethyl - β - (2,4,6 - triiodo - 3 - acetamidophenyl)-propionic acid having the formula

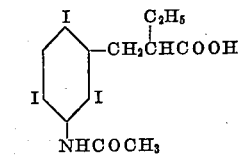

4. β-(2,4,6-triiodo - 3 - propionamidophenyl)-propionic acid having the formula

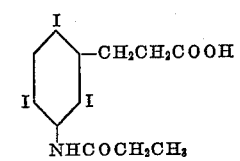

5. α - Ethyl - β - (2,4,6 - triiodo - 3 - formamidophenyl)-propionic acid having the formula

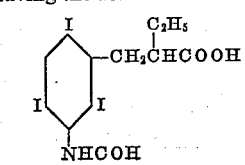

6. α - Ethyl - β - (2,4,6 - triiodo - 3 - propionamidophenyl)-propionic acid having the formula

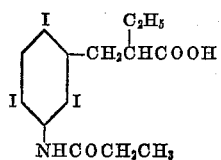

7. A 2,4,6-triiodo-3-acylaminophenylalkanoic acid having the formula

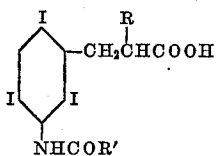

wherein R is a member of the group consisting of hydrogen and alkyl groups having from 1 to 4 carbon atoms and R' is a member of the group consisting of alkyl groups having from 1 to 4 carbon atoms.

8. A member of the group consisting of: compounds having the formula

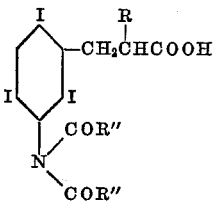

wherein R represents a member of the group consisting of hydrogen and lower-alkyl radicals, and R" represents a lower-alkyl radical; and pharmacologically acceptable salts thereof.

9. A compound having the formula

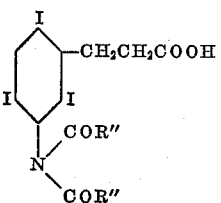

wherein R" represents a lower-alkyl radical.

10. A compound having the formula

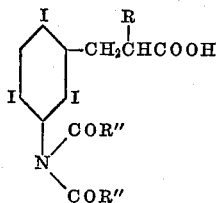

wherein R and R" represent lower-alkyl radicals.

11. A compound having the formula

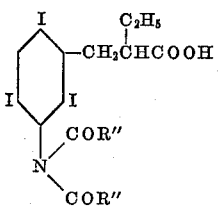

wherein R" represents a lower-alkyl radical.

12. α-Ethyl - β - (3 - dibutyramido - 2,4,6 - triiodophenyl)-propionic acid.

13. α - Ethyl - β - (3 - diacetamido - 2,4,6 - triodophenyl)-propionic acid.

14. α - Etthyl - β - (3 - dipropionamido - 2,4,6 - triiodophenyl)propionic acid.

15. β - (3 - diacetamido - 2,4,6 - triiodophenyl)propionic acid.

16. Sodium β - (3 - diacetamido - 2,4,6 - triiodophenyl)-propionate.

17. The process for preparing an N-lower-acylated derivative of a (3-amino-2,4,6-triiodophenyl)alkanoic acid which comprises heating said (3-amino-2,4,6-triiodophenyl)alkanoic acid with a member of the group consisting of lower-alkanoic acids, lower-alkanoic acid halides and lower-alkanoic acid anhydrides.

18. The process according to claim 16 in which the acylating agent is a lower-alkanoic acid anhydride.

19. The process for preparing an N-lower-acylated derivative of α-ethyl-β-(3-amino-2,4,6-triiodophenyl)-propionic acid which comprises heating said α-ethyl-β-(3-amino-2,4,6-triiodophenyl)propionic acid with a lower-alkanoic acid anhydride.

20. The process according to claim 18 in which the lower-alkanoic acid anhydride is acetic anhydride.

No references cited.

UNITED STATES PATENT OFFICE

Certificate of Correction

Patent No. 2,895,988            July 21, 1959

Sydney Archer et al.

It is hereby certified that error appears in the printed specification of the above numbered patent requiring correction and that the said Letters Patent should read as corrected below.

Column 1, line 44, for "symptons" read —symptoms—; column 2, line 24, for "chloride" read —chlorine—; line 37, for "reactions" read —reactants—; column 4, line 27, for "cholecystrograms" read —cholecystograms—; line 31, for "α-ethyl-β-(2,4,6-triiodo-3-acetamidophenyl-pro-" read — α-ethyl-β-(2,4,6-triiodo-3-acetamidophenyl) pro- —; column 10, line 26, for "triodo-" read — triiodo- —; line 28, for "Etthyl" read —Ethyl—.

Signed and sealed this 1st day of March 1960.

[SEAL]

Attest:
KARL H. AXLINE,
Attesting Officer.

ROBERT C. WATSON,
Commissioner of Patents.